United States Patent
Rehm et al.

(10) Patent No.: US 6,336,744 B1
(45) Date of Patent: Jan. 8, 2002

(54) LINEAR DRIVE AND PROCESS FOR ASSEMBLY AND DISMANTLING OF SAID LINEAR DRIVE

(75) Inventors: Karl Rehm, Mindelheim; Dietmar Stoiber, Grünwald, both of (DE)

(73) Assignees: Siemens Linear Motor Systems GmbH & Co. KG, München; Grob-Werke Dr. h.c. mult. Dipl.-Ing. Burkhart Grob e.K., Mindelheim, both of (DE)

( * ) Notice: Subject to any disclaimer, the term of this patent is extended or adjusted under 35 U.S.C. 154(b) by 0 days.

(21) Appl. No.: 09/522,838

(22) Filed: Mar. 10, 2000

(30) Foreign Application Priority Data

Mar. 11, 1999 (DE) .......................... 199 10 734

(51) Int. Cl.[7] ........................... F16C 43/06; F16C 29/06
(52) U.S. Cl. ........................ 384/59; 384/45; 29/898.03
(58) Field of Search .............. 384/45, 59; 29/898.03; 310/12; 318/135

(56) References Cited

U.S. PATENT DOCUMENTS

| | | | | |
|---|---|---|---|---|
| 4,774,442 A | * | 9/1988 | Teramachi | 318/135 |
| 5,076,714 A | * | 12/1991 | Teramachi | 384/45 |
| 5,359,245 A | * | 10/1994 | Takei | 310/12 |
| 5,696,411 A | * | 12/1997 | Takei | 310/12 |
| 5,825,104 A | * | 10/1998 | Kondo et al. | 310/12 |
| 5,850,112 A | * | 12/1998 | Sienz et al. | 310/12 |
| 6,054,783 A | * | 4/2000 | Philipp et al. | 310/12 |

FOREIGN PATENT DOCUMENTS

| | | | | |
|---|---|---|---|---|
| DE | 3620741 | | 1/1987 | |
| JP | 02203012 | * | 8/1990 | 384/45 |

OTHER PUBLICATIONS

Linear guides precision–mounted . . . , "Der Konstrukteur", 9/98, p. 35.

* cited by examiner

Primary Examiner—Thomas R. Hannon
(74) Attorney, Agent, or Firm—Jacobson Holman, PLLC

(57) ABSTRACT

A linear drive, comprising a primary part (3) arranged on a slide block (1), wherein the slide block (1) is movable on a guide-rail system (21,22), as well as comprising a stationary secondary part (4), which operates together with the primary part (3) in such a way that the slide block (1) is movable on the guide-rail system (21,22). In order to facilitate insertion and extraction of the primary part (3), a spacer (5) is proposed to be arranged between primary part (3) and slide block (1), which is removable during the dismantling of the primary part (3) from the slide block (1) and thus the separation between primary part (3) and secondary part (4) is adjustable.

23 Claims, 4 Drawing Sheets

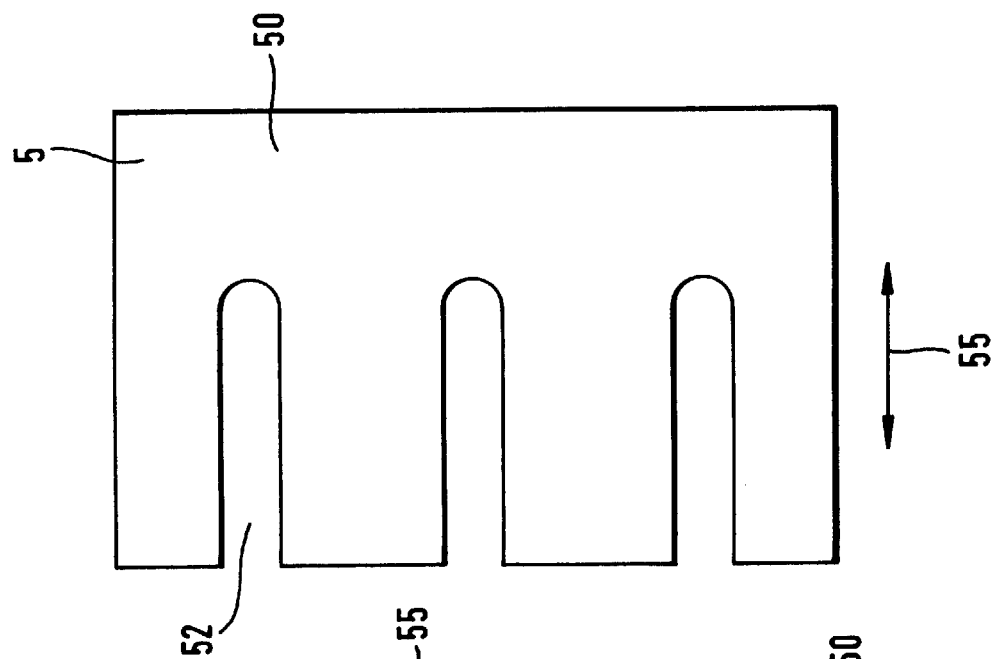
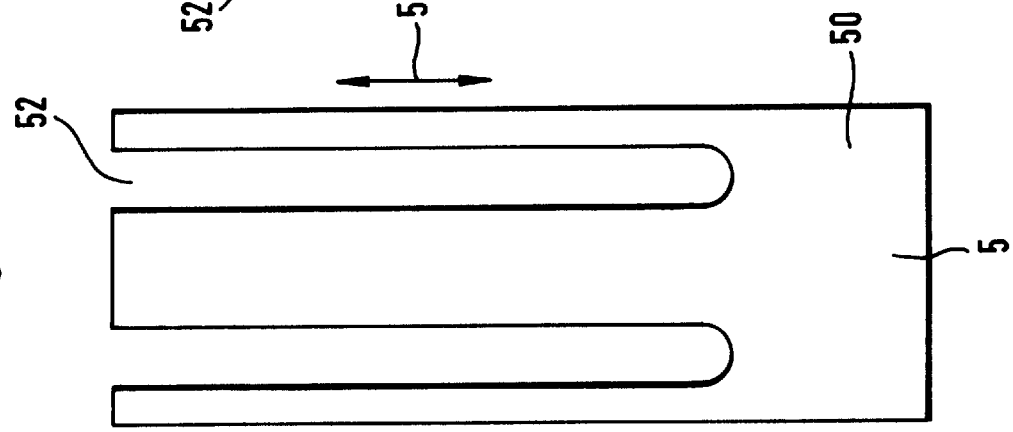
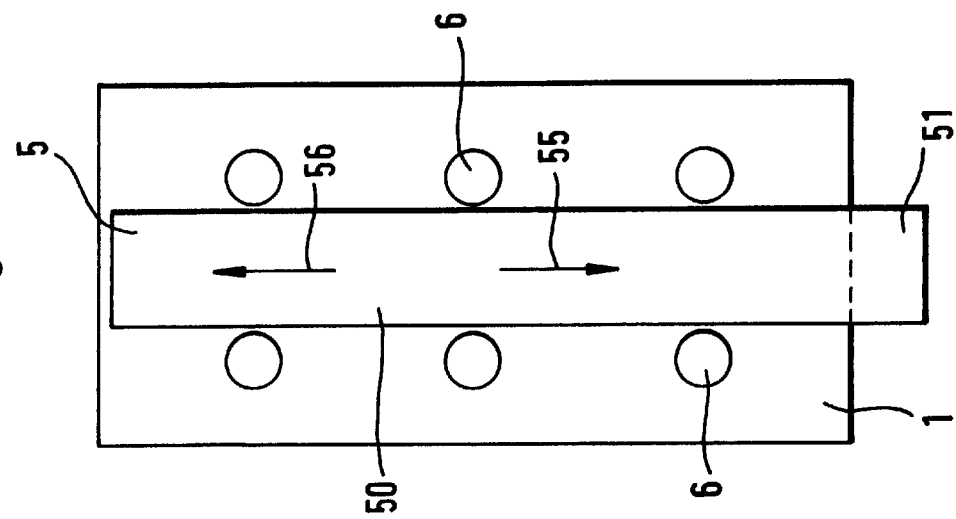

LINEAR DRIVE AND PROCESS FOR ASSEMBLY AND DISMANTLING OF SAID LINEAR DRIVE

BACKGROUND OF THE INVENTION

The invention concerns a linear drive, comprising primary part or a secondary part arranged on a slide block, wherein the slide block is movable on a guide-rail system, as well as a stationary secondary part or primary part, as the case may be, which operates together with the primary part or secondary part arranged on the slide block in such a way that the slide block is movable on the guide-rail system.

Furthermore the invention concerns a process for assembly and dismantling of this linear drive, wherein this process in this case in particular refers to the assembly or dismantling of the primary part or secondary part onto or from a movable slide block.

Prior art linear drives are wide spread in engineeing. For example they are used in machining centres or machine tools, in order to move and position the lathe spindle at higher speed or with greater precision. The secondary part in such instances comprises an arrangement of magnets having alternating polarity. The secondary part is for example arranged to be stationary and operates in conjunction with the primary part. The primary part comprises an electromagnetic drive, in which the current conduction is used to generate a magnetic field, which operates in conjunction with the magnetic field of the secondary part so that the slide block moves on the guide-rails.

BRIEF SUMMARY OF THE INVENTION

The invention is described as follows such that the primary part is located on the slide block and the secondary part is stationary. However the invention is not limited to this arrangement. In the same way it is possible to arrange for the secondary part (ie the arrangement of the magnets) to be movable on the slide block and the primary part to be stationary.

One or more guide-rails may be arranged, for example, as the guide-rail system. To achieve higher efficiency the gap between primary part and secondary part may be designed to be relatively small. This gap ultimately defines the drive efficiency and with this also the power consumption for a movement of the system.

With an arrangement such that the movement travel of the linear drive runs in a horizontal plane, the primary part is located for example beneath the slide block. The lathe spindle, eg a cutting tool machine, is constructed on the slide block. The primary part in this case is connected to the slide block with fixing means, for example with screws. The total assembly attains a considerable weight of up to several tonnes. If the primary part is then to be serviced or to be changed on account of tool wear, this can pose some problems to the fitter. The primary part is constructed beneath the slide block so that this cannot be reached easily. Also it is not always possible to lift up the machine tool associated with it. At the same time it should be noted that in addition to the weight of the slide block and the mounted assembly the magnetic attraction of the secondary part still acts upon all magnetisable elements, which increases the force which would be needed to lift off the guide block from the guide-rail system.

The costly dismantling of the linear drive leads to long maintenance times accompanied by long down-times of the machine tool, which is usually undesirable.

The invention had as its task to improve a linear drive as initially described, to the effect that the time for changing the primary part, and with this the down-time of the plant fitted with the linear drive, is reduced.

The invention here assumes as a starting point a linear drive as initially described, ie a linear drive comprising a primary part and a secondary part, one of which is mounted on a slide block and the other of which is stationary. The invention proposes a that a spacer block is arranged between the primary part or the secondary part and the slide block, which is able to be then from the slide block when dismantling the primary part or the secondary part and the distance between part and secondary part is thus increased. In the gap so formed a means of transport is introduced, upon which the part or the secondary part is lowered and then moved out. From this the process also arises according to the invention for dismantling a primary part or secondary part from a slide block on a movable guide-rail system, wherein a spacer block is arranged between the primary part or the secondary part and the slide block and the primary part or secondary part is held onto the slide block by a means of fixing, which are freed for dismantling so that the spacer block is able to be taken off and the primary part or the secondary part is then moved against the slide block by the fixing means or other positioning means, whereby a gap arises between primary part and secondary part so that a means of transport is arranged in this gap and the fixing means of the primary part is released completely in order to move the primary part away from the slide block using the transport means.

On account of the high magnetic force acting between the primary part and the secondary part, care should be taken that primary and secondary parts do not come into contact with one another or lie flat on one another, since a movement of both elements relative to one another is then only possible with high energy cost, or is impossible. The transport means introduced into the so formed gap consists in this case most favourably of a non-magnetic material and acts as spacer between both of the magnetically attractive elements. On account of the residual gap there will be no adhesion of the two elements, both elements remaining movable one with another.

In the case of the process for dismantling according to the invention the spacer block is preferably held on the slide block by the same fixing means which also fix the primary part to this. Next the spacer block is extracted in order to create space between primary part and slide block, which, after the primary part is moved relative to the slide block, serves to increase the gap between primary and secondary parts so that a useful gap arises.

At the same time it is not necessary that all fixing means are involved, rather it is possible that only a few fixing means serve to fix the primary part to the slide block. At this point the fixing means are at first opened a little and through this the primary part lowered by a few tenths of a millimeter or moved against the secondary part, in order to remove the spacer block sideways. If the spacer block is removed, the primary part is again moved against the slide block with the help of the fixing means, which are then tightened again, or by further means of assistance, eg., positioning means, as a result of which the gap forms. For the idea according to the invention it is not critical that a noticeable gap of a few millimeter remains in the opening condition; it is however essential for the idea according to the invention that the gap between primary part and secondary part is increased by the extraction of the spacer block. In tis way it is also possible that the distance between primary part and secondary part is virtually zero.

The arrangement according to the invention is however limited not only to a process for dismantling the primary part but also concerns also in the inverse sense a process for assembly of a primary part or secondary part on a slide block which is movable on a guide-rail system, wherein the part or secondary part is positioned on or adjacent the transport means under the slide block, wherein the primary part or secondary part is held by the fixing means or positioning means of the slide block and the transport means is removed from the primary part or secondary part, wherein the primary part or secondary part is then removed from the slide block slightly by the fixing means or positioning means, in order to introduce and arrange the spacer block between primary part and slide block and subsequently the primary part and slide block are connected firmly together with the fixing means.

The invention is not limited to the arrangement of the primary part or secondary part above or at the side of the secondary part or primary part. The invention is able to be used in the same way with linear drives whose slide block is able to be processed in a horizontal, vertical or other inclined plane. Provided that the phrase "under the slide block" relates to an arrangement, in which the primary part or secondary part is located between slide block and secondary part or primary part.

During assembly or dismantling, the manipulation gap, hence the available height for introduction and insertion or extraction of the primary part, is deliberately increased by the arrangement according to the invention and then when the primary part is positioned, the superfluous gap is concealed by the spacer block. In case the primary part is to be removed the process is reversed and firstly the available gap height is increased by removal of the spacer block. The gap thickness gained is used in order to introduce a transport means, upon which the primary part is then lowered, laid or supported, in order to transport this away from the linear drive.

It is possible by means of the proposal according to the invention to change the primary part within a shorter time, without dismantling the complete linear drive or removing the slide block from the guide-rail system at the same time. The work reduction resulting from this also leads to distinctly shorter down-times for the machine and consequently to a higher efficiency, of the plant equipped with such a linear drive.

The invention is described as follows, such that the primary part is located on the slide block, and the secondary part is stationary. The invention however is not limited to this arrangement. It is possible in the same way to arrange the secondary part (thus the arrangement of the magnets) to be movable on the slide block and the part arranged to be stationary.

In one variation according to the invention a blank spacing plate is provided for use as the spacer block. The blank plate exhibits a certain thickness which together with the existing gap between primary and secondary parts pre-defines the available gap thickness for a transport means.

By this means a further advantage is provided also in the assembly of the linear drive. The spacer blocks or also the blank plates are provided in a set of various thicknesses, in order to optimise particularly the distance between primary and secondary parts by use of these. At the same time it is possible to equalise the manufacturing tolerances as a result of this.

In addition to the use of blank plates it is also possible to use spacer blocks of different forms, for example bushes and such like, or also spacer blocks with variable thickness.

Furthermore it is beneficial if the spacer block is composed of one or more parts. It is advantageous for an even support for the primary part if the spacer block is arranged to be as flat as possible between the two elements. It is of advantage particularly in the case of larger arrangements, to form the spacer block from several components, so as not to have individual elements which are too bulky. In this it is to be noted fat the installed drive may be difficult to access under some circumstances and that it is therefore more beneficial to use several smaller spacer blocks, rather than one large block.

In a further development of the invention slit-sped recesses are provided in the spacer block or blank plate for fixing means, which are provided for between slide block and primary part. The spacer block is usually built in at right angles to the effective direction of the fixing means between primary part and slide block. The spacer block is able to be inserted along these slit-shaped recesses on the fixing means and offers a correspondingly larger bearing surface especially in the case of larger flatter spacer blocks. In this respect the spacer block may be designed alternatively for insertion without the appropriate recesses. The arrangement of the spacer block between primary part and slide block is then chosen, so that the fixing means do not interfere, as the spacer block exhibits smaller dimensions than the spacing between two fixing means, so that it may be inserted between the fixing means.

More favourably screw connections are provided for as fixing means and/or positioning means. It is also an intention of the invention that the function of the positioning means is simultaneously undertaken by the fixing means. The use of screw fixings is advantageous to the effect that a relatively exact positioning is possible by appropriate choice of the thread-pitch, especially when removing the spacer block. Adjusting gauges, tensioning tools or other such tools may be used as positioning means.

It has proved beneficial if the spacer block exhibits a thickness of a few millimeters, eg two to ten millimeters. The gap resulting from this is adequate to introduce an appropriate transport means and to assemble and dismantle the and secondary parts respectively.

In a preferred arrangement of The invention the slide block is designed to be able to be processed in a horizontal, vertical or inclined plane. In all these cases the arrangement according to the invention achieves the ability to access the primary pat or secondary part which is to be removed.

It is also possible for the slide block to be located above or below the primary part or secondary part, as appropriate. If the slide block is located above the primary part or secondary part the slide block is held by the superposition of gravity with the magnetic attraction forces on the guide-rail system However an "over-head arrangement" is also realisable, wherein for example the guide-rail system is arranged above the slide block and thereby the primary part or secondary part is also arranged above the slide block. The idea according to the invention van also be used with the "over-head arrangement". Apart from the weight of the elements to be removed, the primary or secondary part, which can amount to around 50 kg to 100 kg, a magnetic force of about 1 tonne to 2 tonne acts upon this element. It is however entirely possible that when dismantling a "suspended" assembled linear drive the primary part becomes attracted by the secondary part and consequently the same problem arises, as with a "horizontal" arrangement. However the use of the spacer blocks is advantageous even in this arrangement, which allows the introduction of a transport means, in order to remove the primary part or secondary part respectively.

It is proposed in the process according to the invention that a transport means is used to transport the primary part. It is beneficial here for the transport means to be made from non-magnetic material, for example cardboard, paste-board, plastics or similar. The transport means is in this case for example a support plate which is laid upon the secondary part and upon which the primary part moves by sliding. The advantage of such an arrangement is that a cardboard or other similar support plate is almost always available in a workshop. At the same time the surface finish of cardboard, paste-board or plastics in particular is so soft, that contaminants, for example splinters or such like will not lead to damaging the secondary part surface. On account of the high magnetic forces between primary and secondary parts metal chips which are present between these two part, would scratch the surface of primary/secondary parts when moving.

Apart from use of cardboard, paste-board, plastics etc., it is also possible to employ non-magnetic metals, such as copper or brass. With an appropriate arrangement it is also possible for example to equip the transport means with wheels in order to enable smooth running.

The invention also embraces machine tools which are equipped with a linear drive—as described. The linear drives are particularly well known in the case of machine tools as rapid and precise positioning means. Here it is beneficial for these to be employed as cutting tools, for example in machining centres or automatic milling machines.

BRIEF DESCRIPTION OF THE SEVERAL VIEWS OF THE DRAWINGS

FIG. 4 is a plan view of one embodiment of a spacer block for a linear drive according to the invention.

FIG. 5 is a plan view of an embodiment of a spacer block for a linear drive according to the invention.

FIG. 6 is a plan view of an embodiment of a spacer block for a linear drive according to the invention.

DETAILED DESCRIPTION OF THE INVENTION

Figure 1:
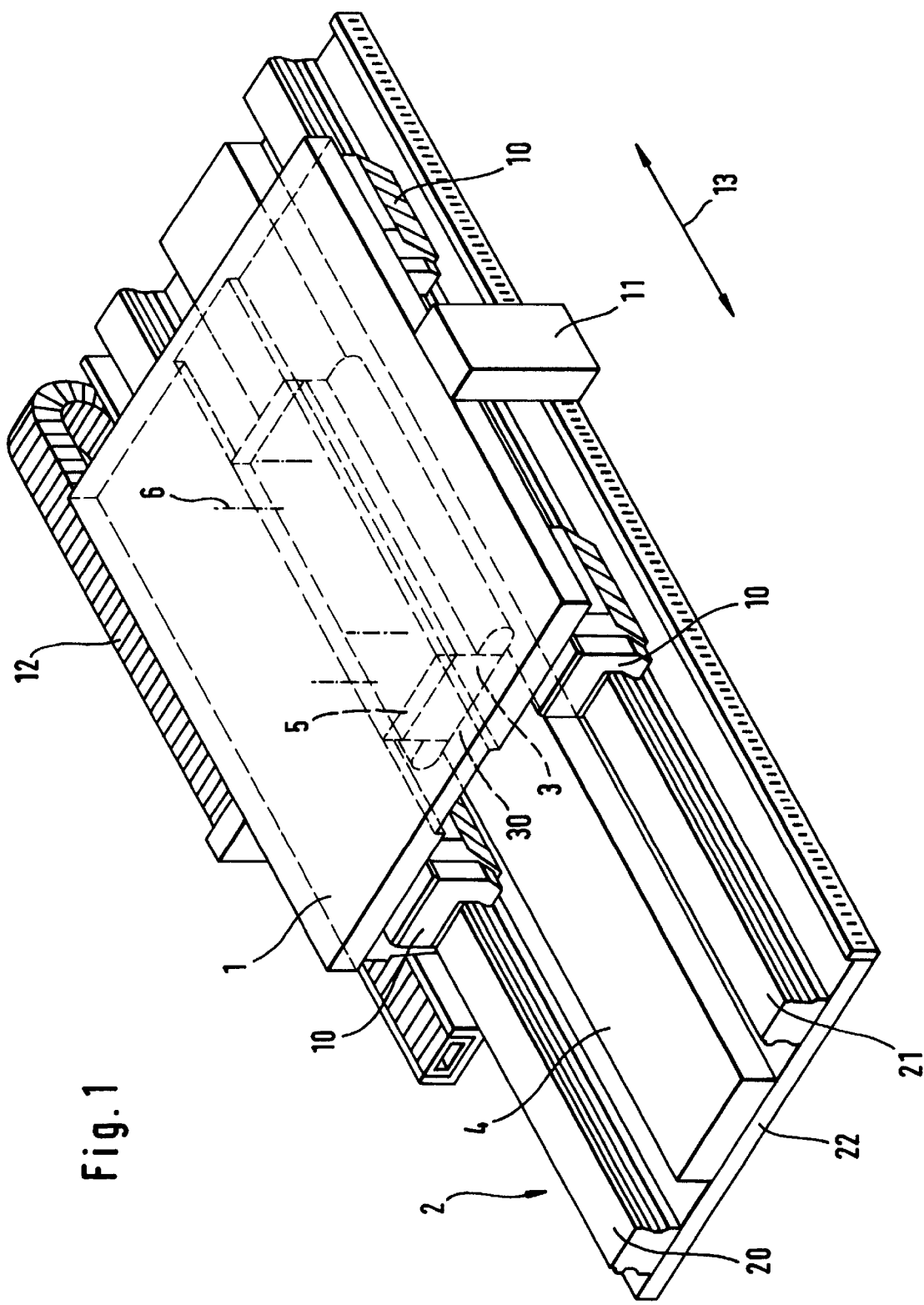
FIG. 1 is a perspective view of a linear drive according to the invention.

An overview of the linear drive according to the invention is shown in FIG. 1. A slide block 1 is carried on a guide-rail system 2, movable along the double arrow 13. The guide-rail system comprises a base plate 22, on which two guide rails 20, 21 are arranged parallel to one another.

The slide block 1 exhibits several shoes 10, by which the slide block 1 is cared on the guide rails 21, 21. Without being shown here, units a arranged on the slide block 1, which because of the linear drive are movable and positionable. Examples of possible units are lathe spindles for cutting tools. The aforementioned linear drives are for example employed in machining centres for metal working.

A distance measuring system 11 is arranged at The side of the slide block 1, in order to determine the position of the slide block 1 on the guide-rail system 2.

The elements arranged on the slide block 1, in particular the primary part 3, are connected by conductors, which are arranged in a flexible cable duct 12, to elements and supply sources (not shown).

In order to move the slide block 1, on the guide-rail system 2, a primary part 3 is provided beneath the slide block 1. The primary part 3 is separated by a small gap 30 from a secondary part 4. The secondary part 4 is located in the arrangement shown here between both the guide rails 20, 21 on the base plate 22. Any other arrangement of the two elements primary part 3 and secondary part 4 is also possible. For example it is conceivable that a slide block 1 is driven by two primary parts and two secondary parts, which are arranged at the side of the slide block. The gap 30, which is located between The primary part 3 and the secondary part 4, usually amounts to around 1 to 1.5 mm. The space conditions ate correspondingly tight. When removing the primary part 3 this air gap is insufficient to extract the primary part 3 from the area between slide block 1 and secondary part 4. An enlargement of the air gap 30 is however not possible, since the efficiency of the electromagnetic drive is thereby made worse.

The secondary part 4 comprises an arrangement of magnets (electro-, permanent or electro-permanent magnets) with alternating polarity, which act together with an electromagnetic drive of the primary part 3, in such a way that movement of the slide block along the guide-rail system is possible.

In order to facilitate the assembly or dismantling of the primary part 3, it is proposed that a spacer block 5 is arranged between primary part 3 and slide block 1. The primary part 3 and the secondary part 4 are both connected to the slide block 1 by fixing means 6, which are only indicated in FIG. 1. Screws for example are envisaged as fixing means 6 in this case, which for example mesh in with the corresponding thread in the primary part 3 from above through the slide block 1 and thus fix the primary part 3 to the slide block 1. It is proposed according to the invention that the spacer block 5 is removed prior to dismantling the primary part 3, in order thereby to enlarge the effective air gap 30. When assembling the primary part 3 the spacer block 5 is installed only after the part is positioned and if required also held by the fixing means 6 or other positioning means. Thus also the working air gap, that is to say the air gap which is provided for when operating the linear drive, is adjusted. The working air gap here is smaller than the air gap 30, which exists when the primary part 3 is installed or remove In FIG. 2 various arrangements of the fixing means are indicated. In the left-hand arrangement a screw 61 having polygonal head is inserted through a bole 14 in the slide block 1 and hole 31 in the primary part 3, which exhibits a thread 32. When conducting the process according to the invention the fixing means is then first opened a little, in such a way that the spacer block arranged between the primary part 3 and the slide block 1 is moving freely, in order to remove this and thus to create a removal clearance. In the view shown in FIG. 2 the part is located beneath the slide block 1. By slight opening of the fixing means %₁ gravity acts, so that the primary part 3 distances itself automatically from the slide block 1, in order to release the spacer block 5. However the invention is not limited to an arrangement of the primary part 3 under the slide block 1. It depends upon a relative movement of the primary part 3 with the slide block 1, which for example is able to be derived from a sloping or vertical arrangement of appropriate means of power (springs or similar).

Figure 2:
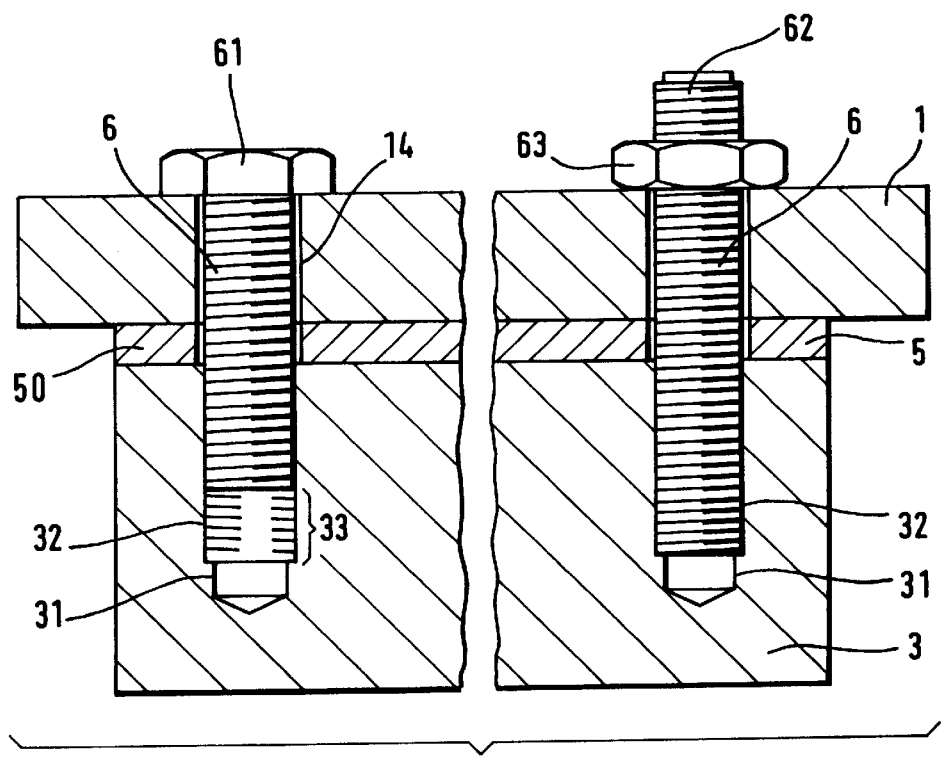
FIG. 2 is a side-view of a detail of the linear drive according to the invention.

If the spacer block 5 is removed, the primary part 3 is moved against the slide block 1, eg with help from the fixing means 6 or other positioning means (which are not shown here), in FIG. 2 for example lifted. It is noted here that the available depth 33 of the hole 31 is sufficient for the screw 61 to be screwed in far enough for the primary part 3 to be drawn against the slide block 1. The available depth 33 is therefore chosen to be rather larger than the thickness of the spacer block 5.

The arrangement indicated in FIG. 2 corresponds in essence to the relationships as are given in FIG. 1. It is to be noted that the magnetic attraction is distinctly greater than gravity, for this reason it is possible that the item removed, for example the primary part or the secondary part, is drawn vertically upwards.

As indicated it is to be avoided that primary part and secondary part come to lie flat upon one another, since then enormous magnetic forces act and improper detachment of both parts can lead under some circumstances to mechanical destruction of one or both elements. Conversely it is however possible to measure the thickness of the transport means relative to the support plate, if the magnetic forces are known, so that on the one hand an adequate retention force exists and at the same time the element removed remains movable upon the corresponding element.

If it is not possible to provide for an appropriate depth hole 31 in the primary part 3, an appropriate variant is proposed as shown to the right in FIG. 2. In this case a bolt 62 having a run-through thread (or a threaded rod) is provided as a fixing means, which is screwed right into a hole 31 having read 32 in the primary part 3. On the slide block 1 a nut 63 is screwed onto the free end of the bolt 62 and forces the primary part 3 against the slide block 1 in the installed state. If the primary part 3 is then extracted, the nut 63, similarly to that described previously, is slackened slightly, in order to remove the spacer block 5. Subsequently the nut 63 is simply turned on the bolt 62 for enough for the primary part 3 to rest upon the slide block 1. In this case the available depth of hole 31 does not matter.

Figure 3:
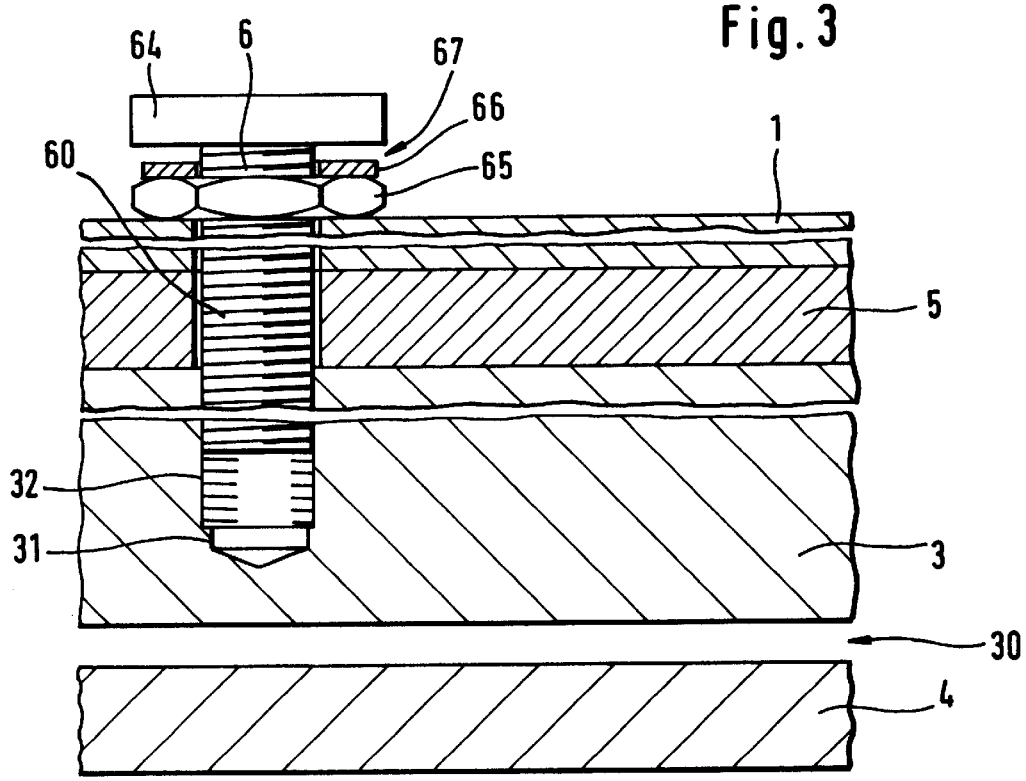
FIG. 3 is a side-view of a detail of the linear drive according to the invention.
Figure 7:
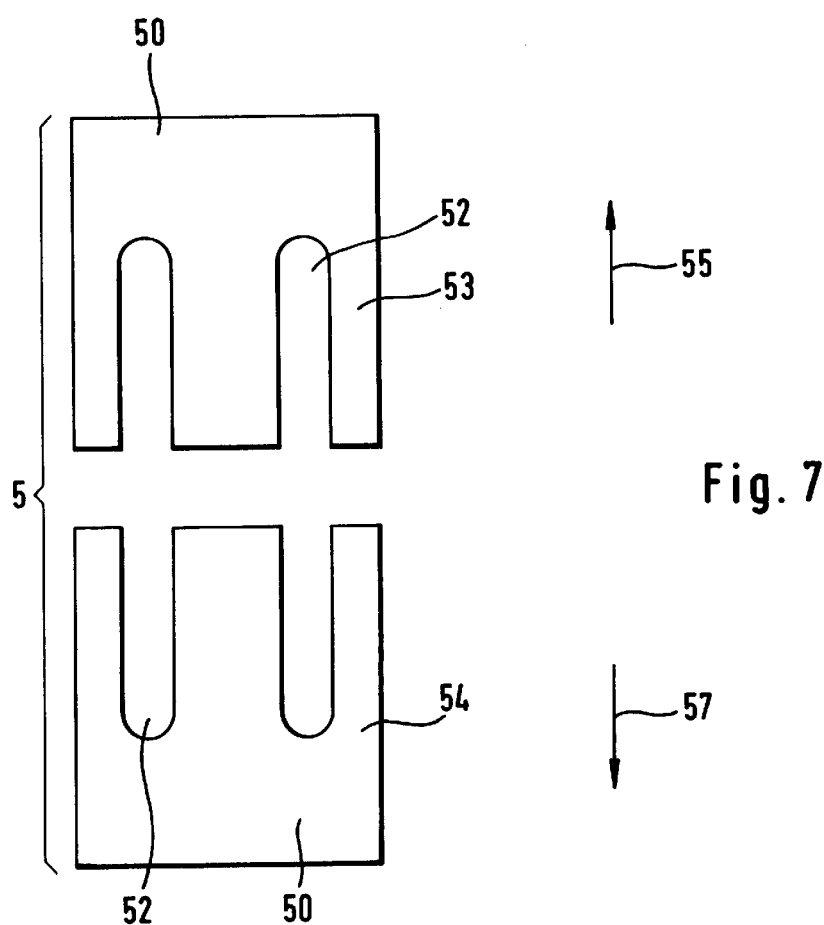
FIG. 7 is a plan view of an embodiment of a spacer block for a linear drive according to the invention.

In FIG. 3 a further form of the fixing means 6 arrangement is shown. Here a screw 60 is again screwed into a hole 31 having bread 32 in the primary part 3. FIG. 3 is here not to scale. Here the screw head 64 does not lie on th slide block 1 surface, but is located above an adjusting screw 65. Between the nut 65 and the head 64 an adjusting washer 66 is arranged. If the spacer block 5 is extracted, the nut 65 is released, which means being turned in the direction of the head 64. The residual gap 67 between the adjusting washer 66 and the head 64 corresponds with the dimension by which the primary part 3 is removed from the slide block 1, in order to extract the spacer 5. Through one such arrangement it is ensured that when dismantling the primary part 3 the primary part 3 does not come into contact with the secondary part 4. If such a case arose the forces needed to separate the two elements, would be very great, wherein also it is to be noted that if the magnetic elements stick together, this can also lead to the primary part 3 buckling, if an attempt is made to remove the primary part 3 only one-sided from the secondary part 4. By this safety device it is ensured that a minimal gap 30 still exists in the released position of the primary part 3 from the slide block 1 and the primary part 3 does not lie on the secondary part.

Figure 8:
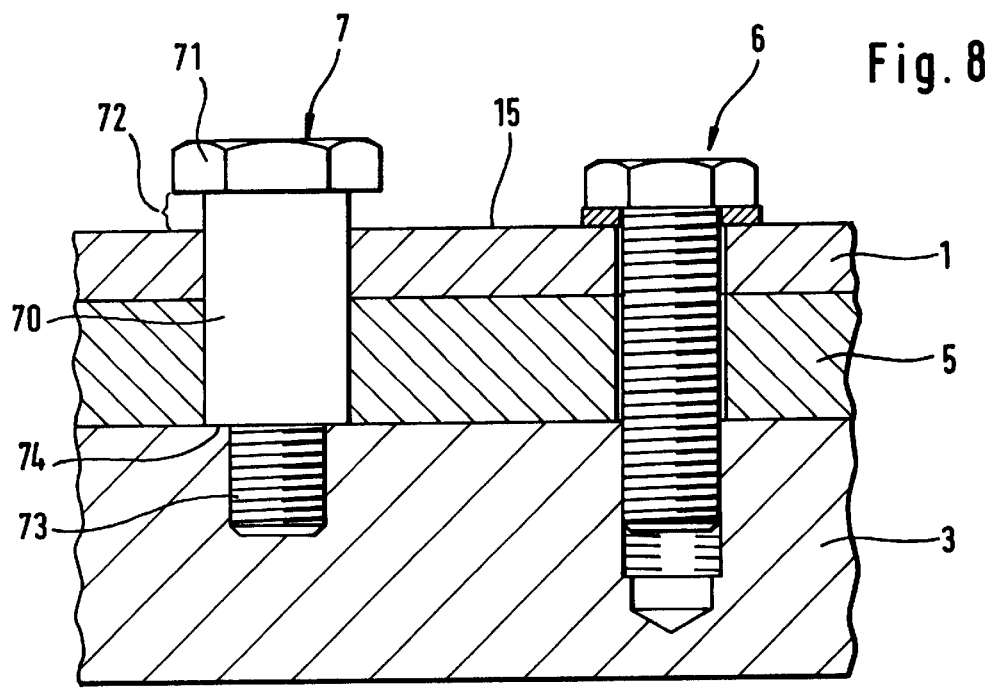
FIG. 8 is a side-view of a detail of the linear drive according to the invention.

FIG. 8 shows a further arrangement of a safety device for the process for assembling and extraction of the linear derive according to the invention. Apart form the known fixing means 6 (here indicated to the right), a spacing element 7 is envisaged. The mounted position is shown in FIG. 8. The fixing means 6, for example a screw, connects the primary part 3 (or as indicated several times also the secondary part 4) with the slide block 7, for example a bolt having a head, is screwed into the primary part 3 with its lower area having threaded section 73. The bolt exhibits a shaft 74 below which the threaded section 73 connects. The spacing element 7, or as the case may be the bolt 70, lies with the shaft 74 on the side of the primary part 3 turned towards the spacer block 5. In the assembled position shown here an offset is formed between the upper side of the slide block 1 and the underside of the bolt head 71, in which the bolt head 71 appears to project from the slide block 1. This separation 72 between the underside of the bolt head 71 and the upper surfaces 15 of the slide block 1 defines the maximum withdrawal depth and thus ensues that when extracting the primary part 3 (or the secondary part 4) this does not come into contact with the other element so that these join together through the magnetic forces and are inseparable or separable only with difficulty. The separation 72 is of shorter length than the normal air gap 30 in the assembled state. The maximum withdrawal depth is adequate to remove the spacer block 5. After that, as described, the element to be extracted, for example with the fixing means 6 (against the magnetic force), is attracted to the slide block 1, the transport means forced into the enlarged gap and then both the fixing means 6 and the spacing element 7 removed, whereby the element to be extracted lies upon the transport means and is removable from this. For safe handling it is here envisaged that various diameter holes or threads are used, alternatively various colour codings for the fixing means and spacing elements are provided.

In FIGS. 4 to 7 different arrangements for the spacer blocks are shown.

Additionally a view from below of the slide block 1 with the fixing means 6 indicated is shown in FIG. 4. In the case of the arrangement shown here the spacer block 5, which for example is formed as rectangular blank plate 50, is located between the fixing means 6. Removal of the spacer block 5 can be effected in two directions (indicated by the double-arrows 55, 56), wherein for example the blank plate 50 in such a case is removable parallel to the fixing means array. The blank plate 50 has a projection 51 at one end, which is formed so that this for example is able to be reached by hand or with a tool, in order to move the spacer block in the space between slide block 1 and primary part 3.

In an improved form, slit-shaped recesses 52 are arranged in the spacer block 5 in FIGS. 5 and 6, which are arranged so that the fixing means 6 pass into these slit-shaped recesses 52. Admittedly the assembly of the spacer block 5 in such a case is rather more involved (due to cutting the recesses 52), but with this component a larger locating surface of the spacer block 5 and also on the slide block and also on the primary part 3 is available, as a result of which the occurance of tipping moments during assembly is reliably avoided. The extraction direction of the blank plate 50 in this case runs parallel to the recess array 52 and is identified by the arrow 55.

The arrangements according to FIGS. 5 and 6 correspond with the indicated underside view of the slide block 1 in FIG. 4. In FIG. 5 two slits 52 are indicated, in order to enable lengthwise retraction of the blank plate according to FIG. 5 in the case of an arrangement of fixing means according to FIG. 4.

In FIG. 6 three recesses 52 are arranged, in order to achieve transverse retraction. In FIG. 6 the recesses 52 are disposed on the long side, in FIG. 5 on the transverse side.

In a further variant the spacer block 5 is envisaged as being constructed from several elements 53, 54. Both the elements 53, 54, which for example are again formed as blank plates, in this arrangement possess slit-shaped recesses 52, in order to provide an insertion mechanism, in particular in the area of the fixing means 6. The extraction directions of Me two elements 53, 54 of the spacer blocks 5 are again indicated by the arrows 55, 57. With one such arrangement the spacer block 5 for example is able to be extracted forwards and backwards. Of course, it is possible to construct a spacer block from three or more component parts, wherein these may be arranged by choice without slit-shaped recesses 52.

Although the invention has been described in terms of specific embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. Linear drive, comprising a primary part a secondary part, a slide block, and a guide rail system, one of said primary part and said secondary part being arranged on said slide block, and the other of said primary part and said secondary part being stationary, and said slide block being mounted on said guide rail system, said primary part and said secondary part acting together with said slide block such that said slide block is movable on the guide-rail system, said linear drive further comprising a spacer arranged between said slide block and the one of said primary part and said secondary part which is mounted on said slide block, said spacer being removable when dismantling said primary part or secondary part from said slide block, thus enlarging the separation between said primary part and said secondary part.

2. Linear drive according to claim, wherein said spacer comprises a blank plate.

3. Linear drive according to claim 1, wherein said spacer has slit-shaped recesses for fixing means, which are provided between said slide block and the one of said primary part and said secondary part which is mounted on said slide block.

4. Linear drive according to claim 3, wherein said fixing means comprises a screw connection.

5. Linear drive according to claim 1, wherein said spacer comprises one or more parts.

6. Linear drive according to claim 1, wherein said spacer has a thickness of two to ten millimeters.

7. Linear drive according to claim 1, wherein said slide block is able to be driven in a horizontal, vertical or inclined plane.

8. Linear drive according to claim 1, wherein said slide block is located above or below said primary part, said secondary part or said guide-rail system.

9. Process for dismantling a linear drive as claimed in claim 1, which process comprises a) releasing fixing means by which said primary part or said secondary part is mounted on said slide block;

b) removing said water from between said slide block and the one of said primary part and said secondary part which is mounted thereon;

c) moving said one of said primary part and said secondary part against said slide block;

d) introducing a transport means for said one of said primary part and said secondary part between said slide block and said one of said primary part and said secondary part; and e) moving said one of said primary pat and said secondary part away from said slide block using said transport means.

10. Process according to claim 9, wherein said one of said primary part and said secondary part is held by fixing means while said spacer is being removed.

11. Process according to claim 10, wherein said fixing means comprise screw connections.

12. Process according to claim 9, wherein a support plate consisting of non-magnetisable material serves as transport means.

13. Process according to claim 9, wherein said transport means lies upon the secondary part or primary part.

14. Process according to claim 9, wherein a safety device is provided which limits the removal of said one of said primary part and sad secondary part from said slide block in such a way that said part does not lie on the other one of said primary part and said secondary part during dismantling.

15. Process according to claim 14, wherein said safety device is actuated by fixing means.

16. Process for assembling a linear drive as claimed in clam 1, which process comprises a) position said one of said primary part and sad secondary part on or under said slide, block using transport means;

b) connecting said one of said primary part and said secondary part to said slide block using fixing means;

c) removing said transport means;

d) displacing said one of said primary part and said secondary part slightly from said slide block;

e) inserting said spacer between said one of said primary part and said secondary part and said slide block; and f) fastening said one of said primary part and said secondary pat to said slide block using said fixing means.

17. Process according to claim 16, wherein said fixing means comprise screw connections.

18. Process according to claim 16, wherein a a support plate consisting of non-magnetisable material serves as transport means.

19. Process according to claim 16, wherein said transport means lies upon the secondary part or primary part.

20. Process according to claim 16, wherein a safety device is provided, which limits the removal of said one of said primary part and said secondary part from said slide block in such a way that said part does not lie on the other one of said primary part and said secondary part during assembly.

21. Process according to claim 20, wherein said safety device is actuated by fixing means.

22. Machine tool comprising a linear drive according to claim 1.

23. Cutting machine tool with a linear drive according to claim 1.

* * * * *